US012209578B2

(12) United States Patent
Wu

(10) Patent No.: US 12,209,578 B2
(45) Date of Patent: Jan. 28, 2025

(54) ANTI-PINCH HANDLE FOR AIR PUMP

(71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 90 days.

(21) Appl. No.: 18/071,716

(22) Filed: Nov. 30, 2022

(65) Prior Publication Data

US 2024/0175432 A1 May 30, 2024

(51) Int. Cl.

*F04B 33/00* (2006.01)
*F02M 59/10* (2006.01)
*F04B 39/08* (2006.01)
*G05G 5/06* (2006.01)

(52) U.S. Cl.

CPC ........... *F04B 33/00* (2013.01); *F02M 59/102* (2013.01); *F04B 39/08* (2013.01); *G05G 5/06* (2013.01)

(58) Field of Classification Search

CPC ....... F04B 33/00; F04B 39/08; F02M 59/102; G05G 5/06

See application file for complete search history.

(56) References Cited

U.S. PATENT DOCUMENTS

| | | | | | |
|---|---|---|---|---|---|
| 279,391 | A * | 6/1883 | Jarre | B65B 3/025 | 222/320 |
| 1,432,054 | A * | 10/1922 | Cuff | F04B 33/005 | 74/543 |
| 1,447,669 | A * | 3/1923 | Landin | F04B 33/00 | 92/58.1 |
| 2,497,907 | A * | 2/1950 | Peters | F04B 9/14 | 74/547 |
| 5,460,398 | A * | 10/1995 | Huang | B62B 7/06 | 280/650 |
| 6,464,477 | B1 * | 10/2002 | Wu | F04B 33/005 | 92/58.1 |
| 7,325,314 | B1 * | 2/2008 | Chen | B23D 51/10 | 30/337 |
| 9,133,831 | B2 * | 9/2015 | Wang | F04B 33/00 | |
| 2012/0193592 | A1 * | 8/2012 | Wang | F04B 33/005 | 254/134 |

FOREIGN PATENT DOCUMENTS

| | | | | |
|---|---|---|---|---|
| WO | WO 2018177625 | * | 3/2017 | G05G 1/085 |

* cited by examiner

*Primary Examiner* — Dustin T Nguyen

(74) *Attorney, Agent, or Firm* — Muncy, Geissler, Olds & Lowe, P.C.

(57) ABSTRACT

A handle includes a limiting member, a handle body, a switch member and a biasing member. The limiting member is adapted to connect with an air pump and has a limiting recess. The handle body is pivotally connected to the limiting member to change between a folded position and a use position, and has a slot. The switch member is pivotally arranged in the slot and has a restricting portion detachably engaged with the limiting recess. The restricting portion is engaged with the limiting recess when the handle body is in the use position, and is disengaged from the limiting recess as the switch member moved relative to the slot. The biasing member biases the switch member toward the outside of the slot.

8 Claims, 7 Drawing Sheets

ANTI-PINCH HANDLE FOR AIR PUMP

BACKGROUND

The present invention relates to a handle for an air pump and, more particular, to an anti-pinch handle for an air pump.

U.S. Pat. No. 6,464,477 illustrates a conventional hand pump in FIG. 7. The hand pump includes a cylinder, a piston, and a handle pivotally connected to an end of the piston. The handle can be pivoted to a storage position for saving space when not in use. It was, however, found that the handle was not retained in its operative position during inflation to possible pinch user's hand and thus unable to provide a smooth inflating operation.

Thus, a need exists for an anti-pinch handle for an air pump to mitigate and/or obviate the above disadvantages.

SUMMARY

An objective of the present invention is to provide a handle for an air pump. The handle includes a limiting member, a handle body, a switch member and a biasing member. The limiting member is adapted to connect with the air pump and provided with a limiting recess. The handle body is pivotally connected to the limiting member to be changeable between a folded position and a use position. The handle body is provided with a slot. The switch member is pivotally arranged in the slot and provided with a restricting portion detachably engaged with the limiting recess. The restricting portion is configured to engage with the limiting recess when the handle body is in the use position, and to disengage from the limiting recess as the switch member moved relative to the slot. The biasing member is arranged in the slot and disposed between the handle body and the switch member. The biasing member is configured to elastically bias the switch member toward the outside of the slot.

In an example, the limiting member is further provided with a limiting protrusion adjacent to the limiting recess and a guiding surface formed at one side of the limiting protrusion. The limiting recess and the guiding surface are respectively disposed at two opposite sides of the limiting protrusion. The restricting portion abuts against the guiding surface when the handle body is in the folded position. The restricting portion moves along the guiding surface until the restricting portion passes over the limiting protrusion to engaged with the limiting recess as the handle body pivoted relative to the limiting member.

In an example, the guiding surface is a slope.

In an example, the limiting member is further provided with a first pivoting hole. The handle body is further provided with a second pivoting hole aligned with the first pivoting hole and communicated with the slot. A first pivoting member inserts through the first pivoting hole and the second pivoting hole.

In an example, the switch member is further provided with a pressed portion opposite to the restricting portion and exposed on the slot.

In an example, the handle body is further provided with a third pivoting hole communicated with the slot. The switch member is further provided with a fourth pivoting hole aligned with the third pivoting hole. A second pivoting member inserts through the third pivoting hole, the switch member and the fourth pivoting hole.

In an example, an inner wall surface of the slot is provided with a first stopping portion. One side of the pressed portion facing to the limiting member is provided with a second stopping portion. The biasing member is provided with a central portion, a first abutting portion and a second abutting portion. The first abutting portion and the second abutting portion are respectively disposed at two opposite sides of the central portion. The second pivoting member further inserts through the central portion. The first abutting portion abuts against the first stopping portion. The second abutting portion abuts against the second stopping portion. When the pressed portion is pressed by an external force, the switch member pivots relative to the slot, and the second stopping portion forces the second abutting portion to move toward the first abutting portion.

In an example, the limiting member is further provided with a threaded hole. The air pump includes a piston rod having a threaded portion detachably engaged with the threaded hole.

In another example, the limiting member is further provided with a outer threaded portion. The air pump includes a cylinder having an inner threaded portion detachably engaged with the outer threaded portion.

In an example, an inner wall surface of the slot is provided with an engaging portion engaged with an engaging groove of the air pump when the handle body is in the folded position.

The present invention will become clearer in light of the following detailed description of illustrative embodiments of this invention described in connection with the drawings.

DETAILED DESCRIPTION

Figure 1:
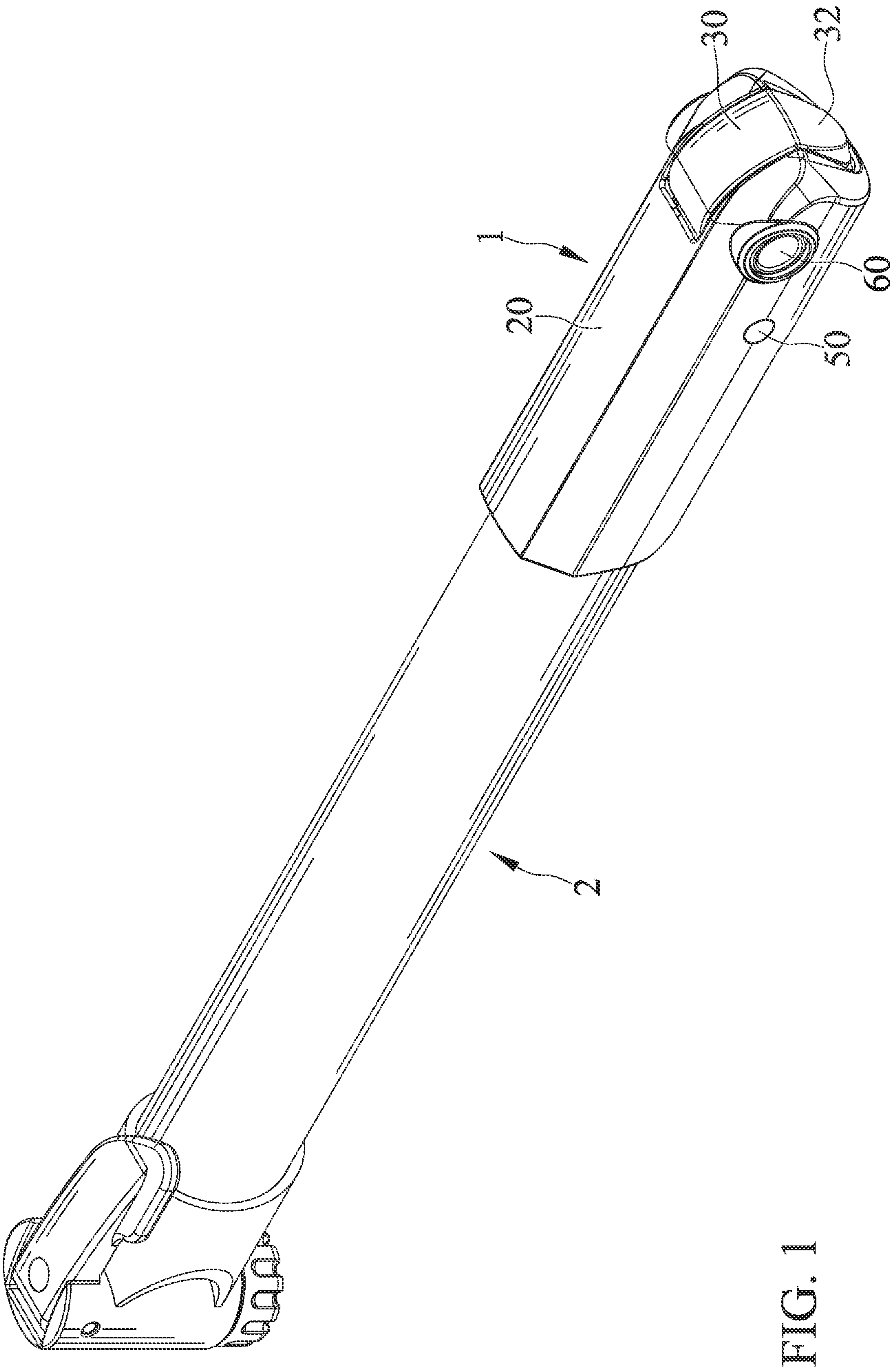
FIG. 1 is a perspective view of a handle for an air pump of a first embodiment according to the present invention and shows the handle used on the air pump.
Figure 2:
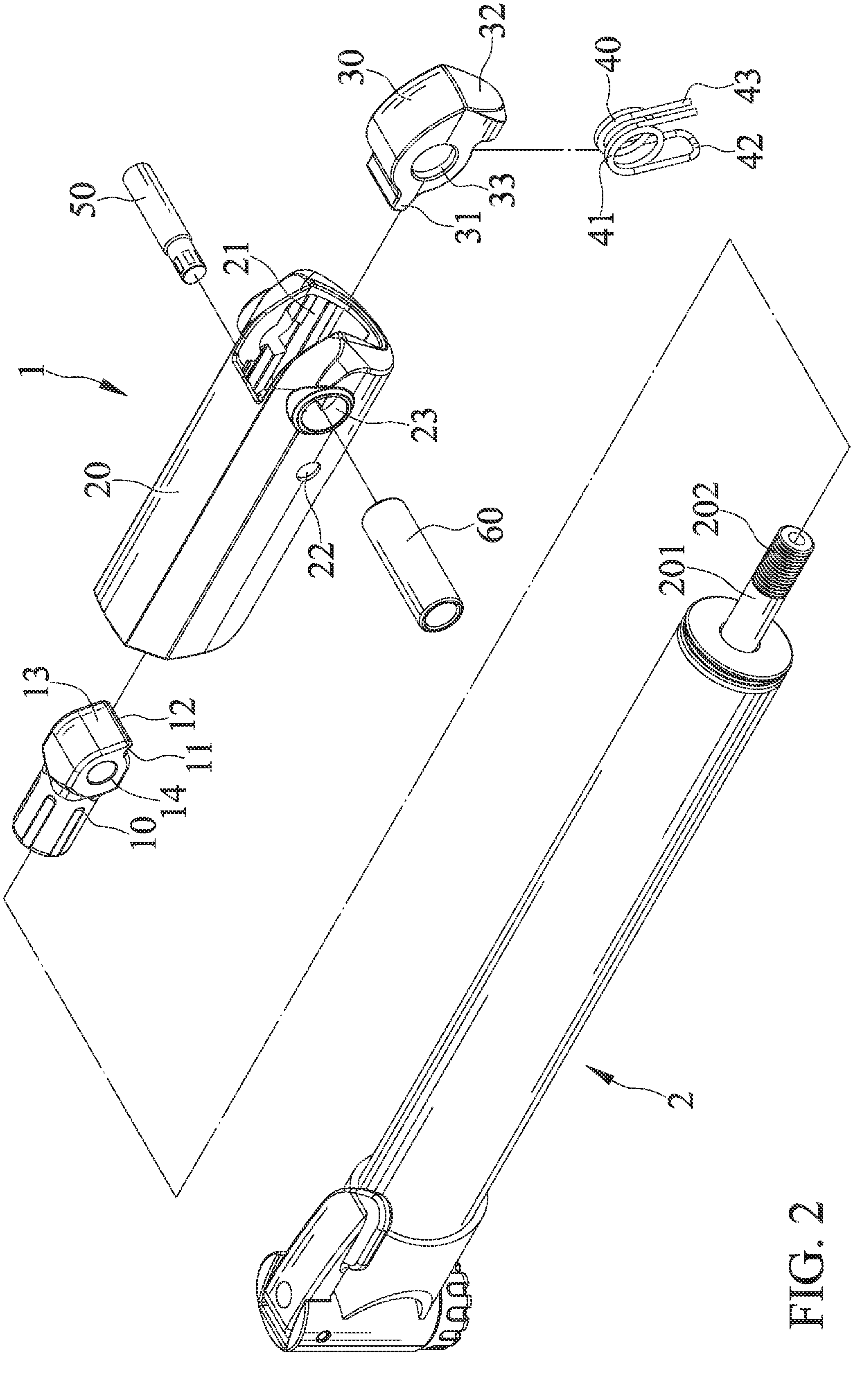
FIG. 2 is an exploded perspective view of the handle of FIG. 1.
Figure 3:
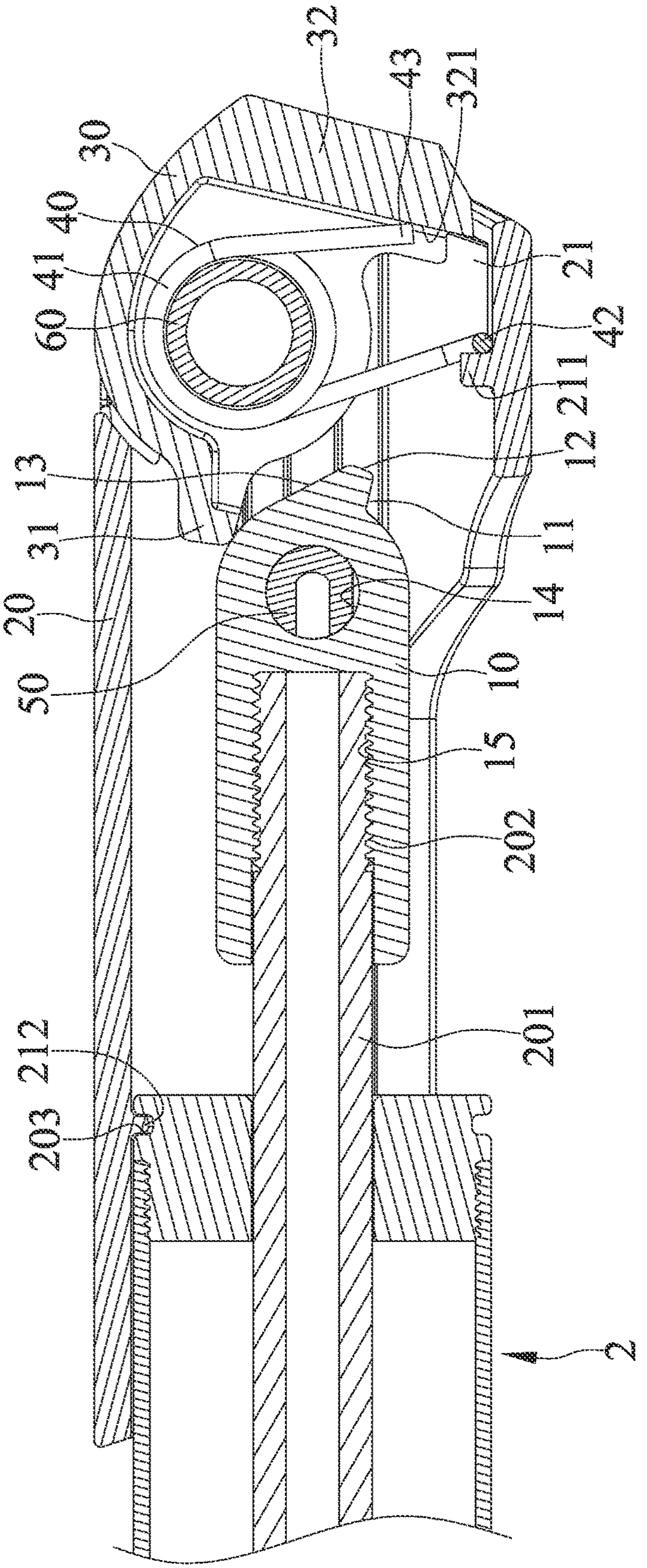
FIG. 3 is a cross sectional view of the handle of FIG. 1 and shows the handle body disposed in the folded position.

FIGS. 1-5 show a handle 1 of a first embodiment according to the present invention. The handle 1 is used on an air pump 2 for a user to hold. The type of the pump 2 is not limited, and it can be a mini portable pump or a floor pump. The following embodiment uses a portable pump 2 as an example for description.

The handle 1 includes a limiting member 10, a handle body 20, a switch member 30 and a biasing member 40. The limiting member 10 is adapted to connect with the air pump 2 and provided with a limiting recess 11. The handle body 20 is pivotally connected to the limiting member 10 to be changeable between a folded position and a use position, and the handle body 20 is provided with a slot 21. The switch member 30 is pivotally arranged in the slot 21 and provided with a restricting portion 31 detachably engaged with the limiting recess 11. The restricting portion 31 is configured to engage with the limiting recess 11 when the handle body 20 is in the use position, and to disengage from the limiting recess 11 as the switch member 30 moved relative to the slot

21. The biasing member 40 is arranged in the slot 21 and disposed between the handle body 20 and the switch member 30, and the biasing member 40 is configured to elastically bias the switch member 30 toward the outside of the slot 21.

In order to allow the restricting portion 31 of the switch member 30 to detachably engage with the limiting recess 11 of the limiting member 10, the limiting member 10 is further provided with a limiting protrusion 12 adjacent to the limiting recess 11 and a guiding surface 13 formed at one side of the limiting protrusion 12. The limiting recess 11 and the guiding surface 13 are respectively disposed at two opposite sides of the limiting protrusion 12. The restricting portion 31 abuts against the guiding surface 13 when the handle body 20 is in the folded position, and the restricting portion 31 moves along the guiding surface 13 until the restricting portion 31 passes over the limiting protrusion 12 to engaged with the limiting recess 11 as the handle body 20 pivoted relative to the limiting member 10.

Further, in order to facilitate the restricting portion 31 to move along the guiding surface 13 and to pass over the limiting protrusion 12 to engage with the limiting recess 11, the guiding surface 13 may be a slope inclined toward the limiting protrusion 12.

The limiting member 10 is further provided with a first pivoting hole 14, and the handle body 20 is further provided with a second pivoting hole 22 aligned with the first pivoting hole 14 and communicated with the slot 21. A first pivoting member 50 inserts through the first pivoting hole 14 and the second pivoting hole 22 to cause the handle body 20 pivotally connected to the limiting member 10 to be changeable between the folded position and the use position.

The switch member 30 is further provided with a pressed portion 32 opposite to the restricting portion 31 and exposed on the slot 21 for the user to press to pivot the switch member 30. The handle body 20 is further provided with a third pivoting hole 23 communicated with the slot 21, and the switch member 30 is further provided with a fourth pivoting hole 33 aligned with the third pivoting hole 23. A second pivoting member 60 inserts through the third pivoting hole 23, the switch member 30 and the fourth pivoting hole 33 to pivotally arrange the switch member 30 in the slot 21.

In order to stably arrange the biasing member 40 between the handle body 20 and the switch member 30, an inner wall surface of the slot 21 is provided with a first stopping portion 211, and one side of the pressed portion 32 facing to the limiting member 10 is provided with a second stopping portion 321. The biasing member 40 is provided with a central portion 41, a first abutting portion 42 and a second abutting portion 43. The first abutting portion 42 and the second abutting portion 43 are respectively disposed at two opposite sides of the central portion 41. The second pivoting member 60 further inserts through the central portion 41. The first abutting portion 42 abuts against the first stopping portion 211, and the second abutting portion 43 abuts against the second stopping portion 321. Furthermore, the biasing member 40 in the embodiment may be integrally wound by a U-shaped elastic metal to form the central portion 41, the first abutting portion 42 and the second abutting portion 43. Understandably, other springs or elastic bodies that can provide biasing force to the switch member 30 can also be used as the biasing member 40.

In the embodiment, the limiting member 10 is further provided with a threaded hole 15, and the air pump 2 includes a piston rod 201 having a threaded portion 202 detachably engaged with the threaded hole 15 to attach the limiting member 10 to the piston rod 201.

As mentioned above, and as shown in FIG. 3, when the handle body 20 is in the folded position, the handle body 20, the limiting member 10 and the air pump 2 are in an I-shaped arrangement for easy storage, and the restricting portion 31 of the switch member 30 abuts against the guiding surface 13 of the limiting member 10. Further, an inner wall surface of the slot 21 is provided with an engaging portion 212 engaged with an engaging groove 203 of the air pump 2 when the handle body 20 is in the folded position, so as to enhance the positioning function of the handle body 20 in the folded position.

Figure 4:
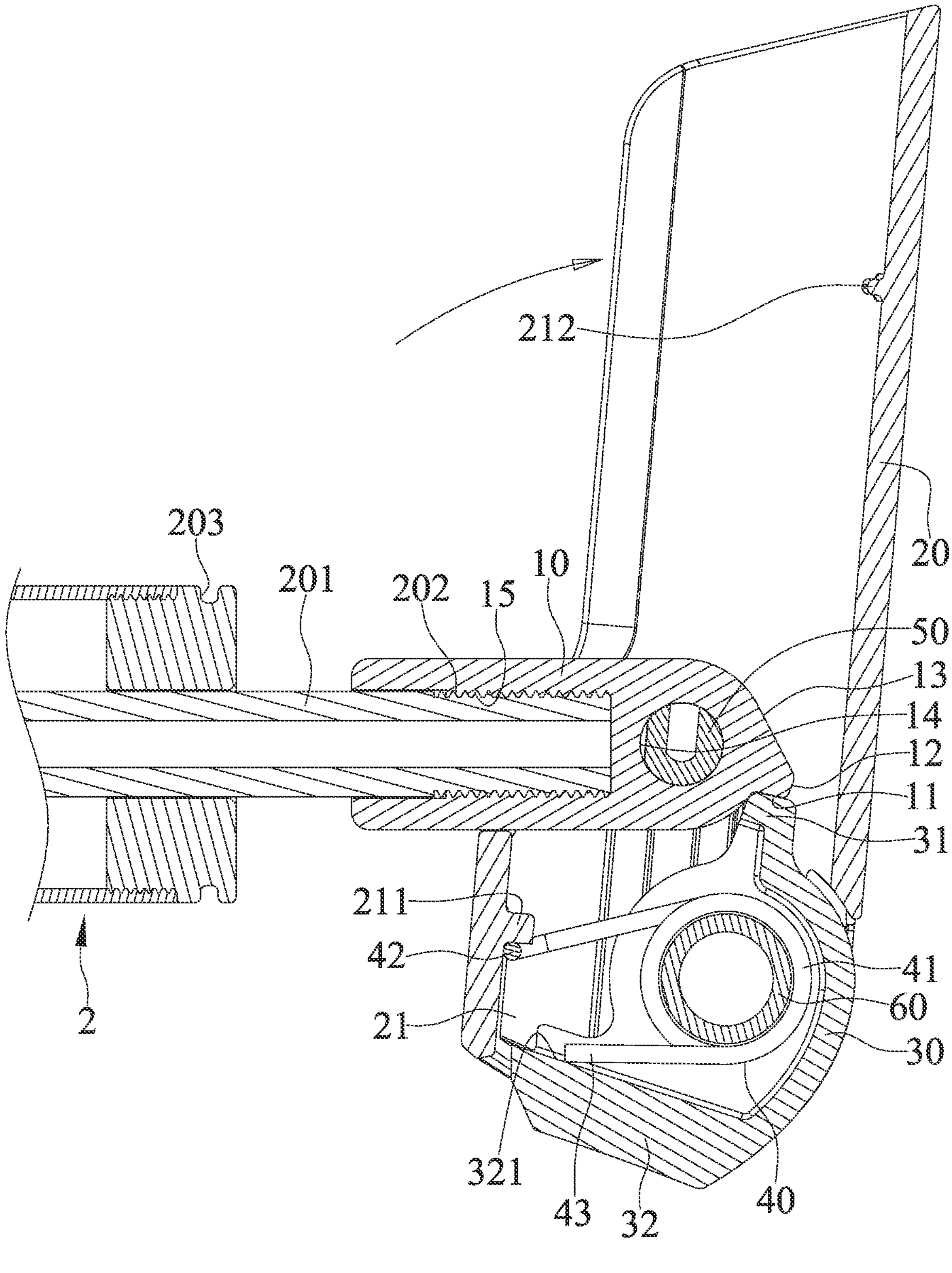
FIG. 4 is a continued view of FIG. 3 and shows the handle body disposed in the use position.

As shown in FIG. 4, the user can apply force to the handle body 20 to make the handle body 20 pivot relative to the limiting member 10 to change from the folded position to the use position. When the handle body 20 is in the use position, the handle body 20 and the limiting member 10 are in a T-shaped arrangement to facilitate the user to hold the handle body 20 to reciprocate the piston rod 201 for inflating. The restricting portion 31 moves along the guiding surface 13 until the restricting portion 31 passes over the limiting protrusion 12 to engaged with the limiting recess 11, so that the handle body 20 cannot pivot relative to the limiting member 10. Thus, the user's hand is prevented from being pinched by the handle body 20 when inflating, and make it easier for the user to hold the handle body 20 for reciprocating.

Figure 5:
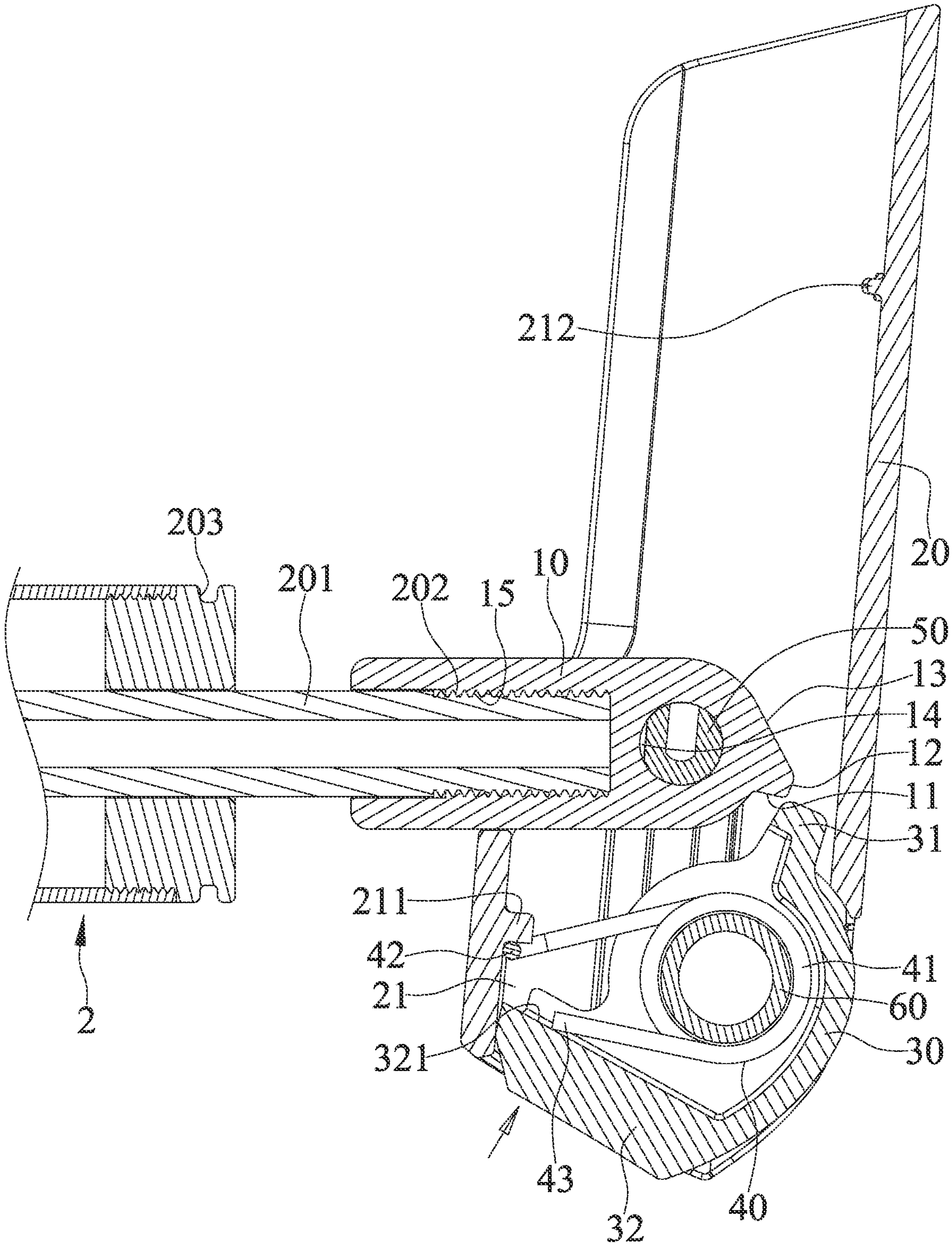
FIG. 5 is a continued view of FIG. 4 and shows the switch member pressed by an external force.

As shown in FIG. 5, when the user intends to change the handle body 20 from the use position to the folded position, the pressed portion 32 can be pressed by an external force from the user to resist the outward biasing force of the biasing member 40. The switch member 30 pivots relative to the slot 21, and the second stopping portion 321 forces the second abutting portion 43 to move toward the first abutting portion 42, so that the restricting part 31 is detached from the limiting recess 11, and the handle body 20 is not limited by the switch member 30 and can pivot relative to the limit member 10 to change to the folded position. Once the user stops applying force to the pressed portion 32, which will be elastically biased toward the outside of the slot 21 by the biasing member 40 and the return to expose on the slot 21.

Figure 6:
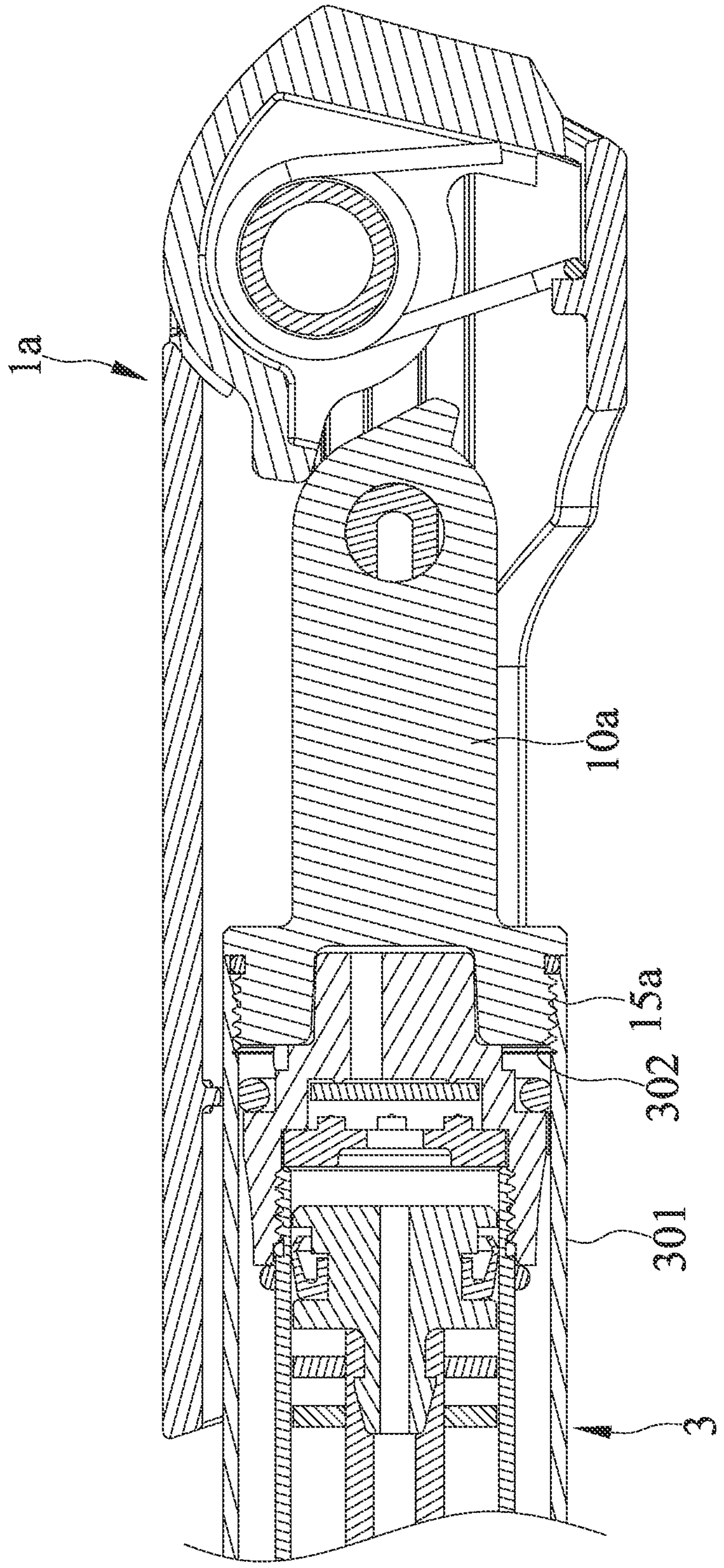
FIG. 6 is a cross sectional view of a handle for an air pump of a second embodiment according to the present invention and shows the handle body disposed in the folded position.
Figure 7:
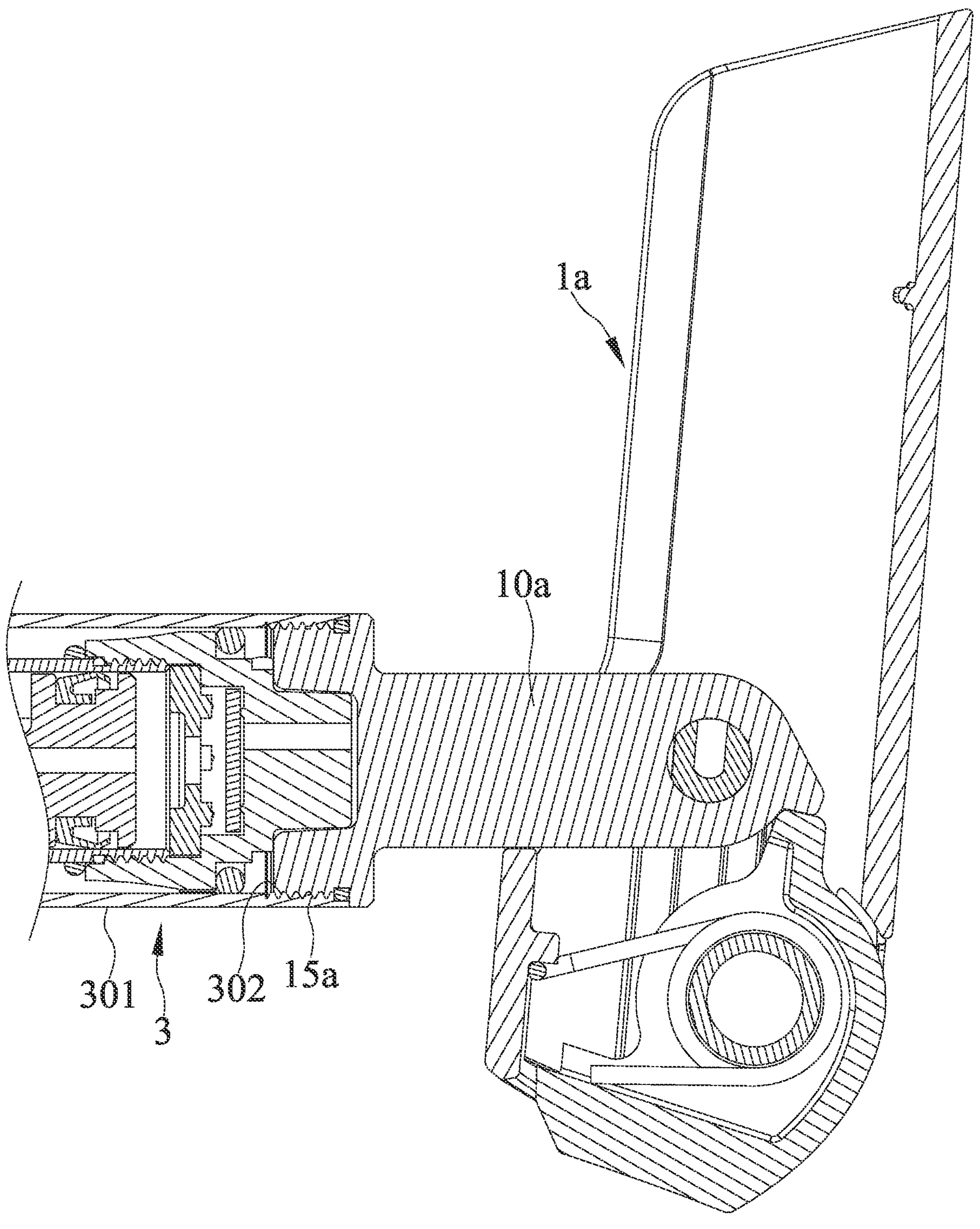
FIG. 7 is a continued view of FIG. 6 and shows the handle body disposed in the use position.

FIGS. 6 and 7 shows a handle 1*a* of a second embodiment according to the present invention. The second embedment is substantially the same as the first embodiment. The main differences are that the limiting member 10*a* is further provided with a outer threaded portion 15*a*, and the air pump 3 includes a cylinder 301 having an inner threaded portion 302 detachably engaged with the outer threaded portion 15*a*.

Although specific embodiments have been illustrated and described, numerous modifications and variations are still possible without departing from the scope of the invention. The scope of the invention is limited by the accompanying claims.

The invention claimed is:

1. An air pump comprising:

an inflating assembly including a piston rod and a cylinder;

a handle including:

a limiting member connected to the inflating assembly and provided with a limiting recess;

a handle body pivotally connected to the limiting member to be changeable between a folded position and a use position, wherein the handle body is provided with a slot;

a switch member pivotally arranged in the slot and provided with a restricting portion detachably engaged with the limiting recess, wherein the restricting portion is configured to engage with the limiting recess when the handle body is in the use position, and to disengage from the limiting recess as the switch member moved relative to the slot; and a biasing member arranged in the slot and disposed between the handle body and the switch member, and wherein the biasing member is configured to elastically bias the switch member toward the outside of the slot, wherein the switch member is further provided with a pressed portion opposite to the restricting portion and exposed on the slot, and wherein the handle body is further provided with a third pivoting hole communicated with the slot, wherein the switch member is further provided with a fourth pivoting hole aligned with the third pivoting hole, and wherein a second pivoting member inserts through the third pivoting hole, the switch member and the fourth pivoting hole.

2. The air pump as claimed in claim 1, wherein the limiting member is further provided with a limiting protrusion adjacent to the limiting recess and a guiding surface formed at one side of the limiting protrusion, wherein the limiting recess and the guiding surface are respectively disposed at two opposite sides of the limiting protrusion, wherein the restricting portion abuts against the guiding surface when the handle body is in the folded position, and wherein the restricting portion moves along the guiding surface until the restricting portion passes over the limiting protrusion to engaged with the limiting recess as the handle body pivoted relative to the limiting member.

3. The air pump as claimed in claim 2, wherein the guiding surface is a slope.

4. The air pump as claimed in claim 1, wherein the limiting member is further provided with a first pivoting hole, wherein the handle body is further provided with a second pivoting hole aligned with the first pivoting hole and communicated with the slot, and wherein a first pivoting member inserts through the first pivoting hole and the second pivoting hole.

5. The air pump as claimed in claim 1, wherein an inner wall surface of the slot is provided with a first stopping portion, wherein one side of the pressed portion facing to the limiting member is provided with a second stopping portion, wherein the biasing member is provided with a central portion, a first abutting portion and a second abutting portion, wherein the first abutting portion and the second abutting portion are respectively disposed at two opposite sides of the central portion, wherein the second pivoting member further inserts through the central portion, wherein the first abutting portion abuts against the first stopping portion, wherein the second abutting portion abuts against the second stopping portion, and wherein when the pressed portion is pressed by an external force, the switch member pivots relative to the slot, and the second stopping portion forces the second abutting portion to move toward the first abutting portion.

6. An air pump comprising:

an inflating assembly including a piston rod and a cylinder;

a handle including:

a limiting member connected to the inflating assembly and provided with a limiting recess;

a handle body pivotally connected to the limiting member to be changeable between a folded position and a use position, wherein the handle body is provided with a slot;

a switch member pivotally arranged in the slot and provided with a restricting portion detachably engaged with the limiting recess, wherein the restricting portion is configured to engage with the limiting recess when the handle body is in the use position, and to disengage from the limiting recess as the switch member moved relative to the slot; and a biasing member arranged in the slot and disposed between the handle body and the switch member, and wherein the biasing member is configured to elastically bias the switch member toward the outside of the slot, wherein the limiting member is further provided with a threaded hole, and wherein the piston rod having a threaded portion detachably engaged with the threaded hole.

7. An air pump comprising:

an inflating assembly including a piston rod and a cylinder;

a handle including:

a limiting member connected to the inflating assembly and provided with a limiting recess;

a handle body pivotally connected to the limiting member to be changeable between a folded position and a use position, wherein the handle body is provided with a slot;

a switch member pivotally arranged in the slot and provided with a restricting portion detachably engaged with the limiting recess, wherein the restricting portion is configured to engage with the limiting recess when the handle body is in the use position, and to disengage from the limiting recess as the switch member moved relative to the slot; and a biasing member arranged in the slot and disposed between the handle body and the switch member, and wherein the biasing member is configured to elastically bias the switch member toward the outside of the slot, wherein the limiting member is further provided with an outer threaded portion, and wherein the cylinder having an inner threaded portion detachably engaged with the outer threaded portion.

8. An air pump comprising:

an inflating assembly including a piston rod and a cylinder;

a handle including:

a limiting member connected to the inflating assembly and provided with a limiting recess;

a handle body pivotally connected to the limiting member to be changeable between a folded position and a use position, wherein the handle body is provided with a slot;

a switch member pivotally arranged in the slot and provided with a restricting portion detachably engaged with the limiting recess, wherein the restricting portion is configured to engage with the limiting recess when the handle body is in the use position, and to disengage from the limiting recess as the switch member moved relative to the slot; and a biasing member arranged in the slot and disposed between the handle body and the switch member, and wherein the biasing member is configured to elastically bias the switch member toward the outside of the slot, wherein an inner wall surface of the slot is provided with an engaging portion engaged with an engaging groove when the handle body is in the folded position.

* * * * *